Figure 6:
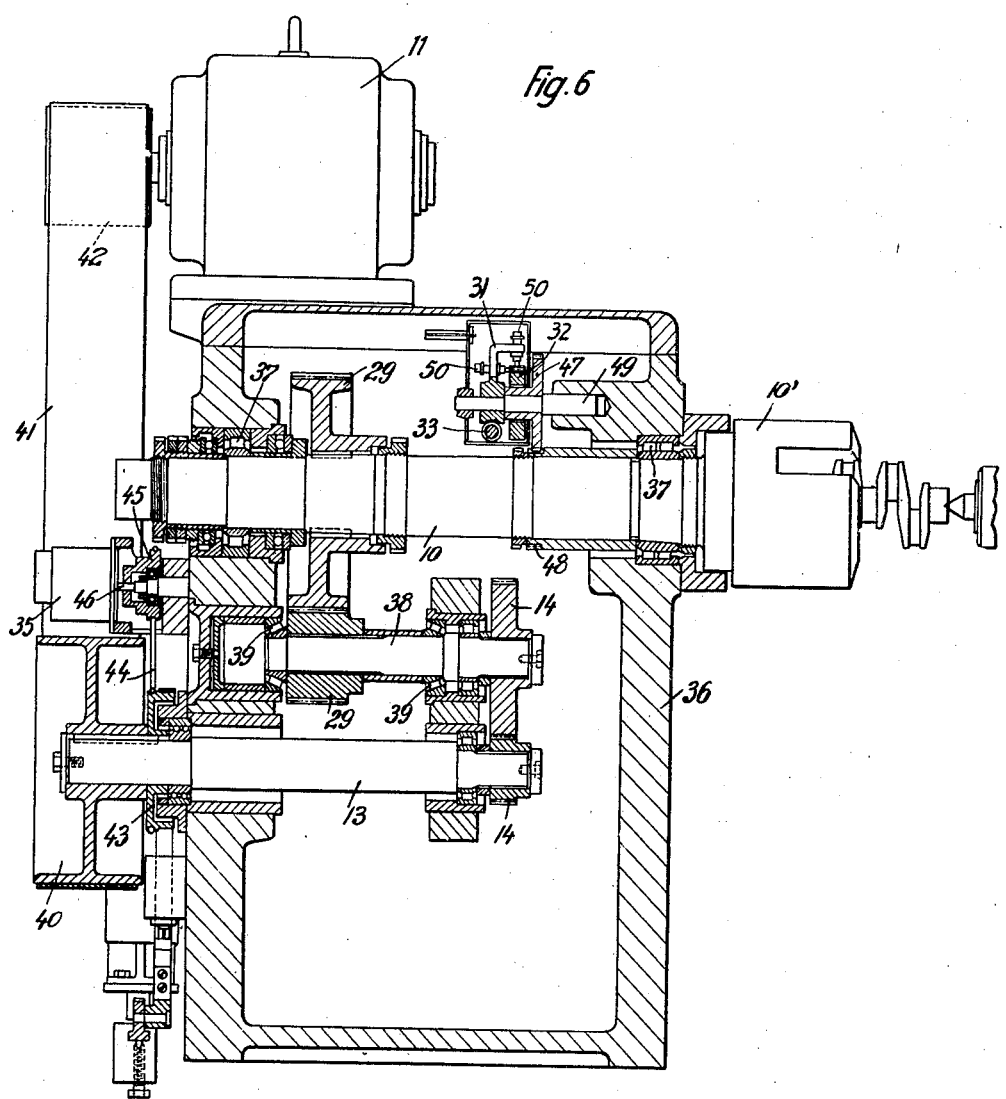

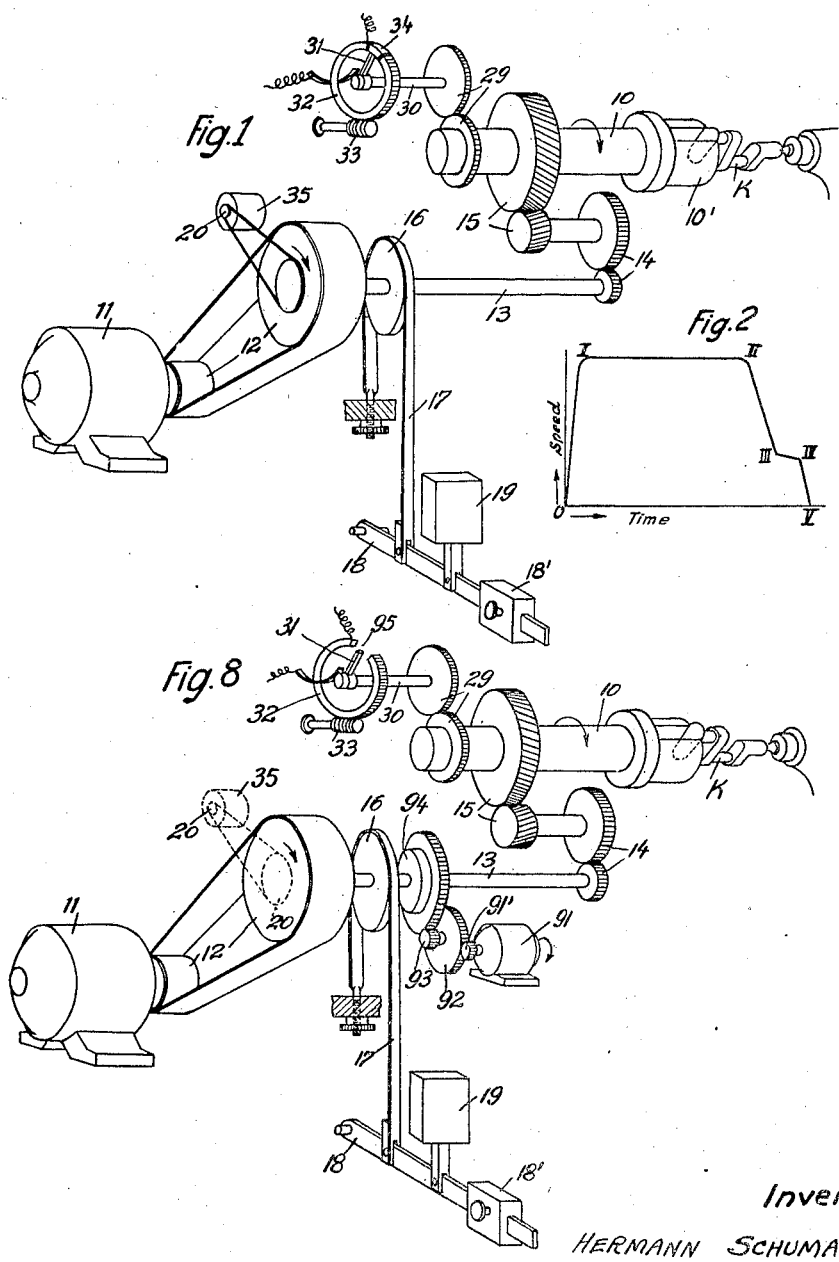

Jan. 11, 1944.  H. SCHUMACHER  2,338,975
CONTROLLING MECHANISM FOR LATHES
Filed July 13, 1940  5 Sheets-Sheet 2
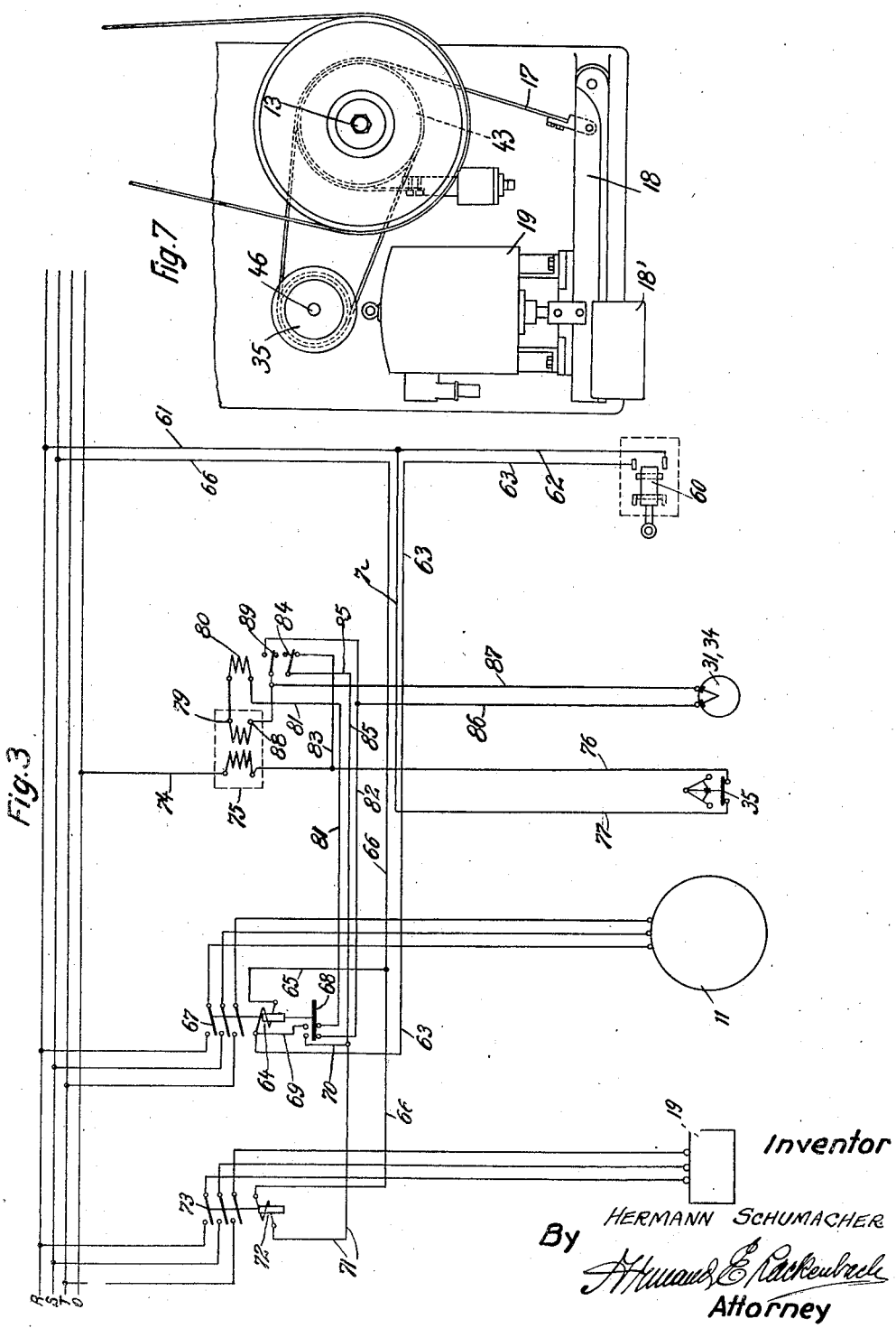
Inventor
HERMANN SCHUMACHER
By
Attorney Jan. 11, 1944.  H. SCHUMACHER  2,338,975
CONTROLLING MECHANISM FOR LATHES
Filed July 13, 1940   5 Sheets-Sheet 3
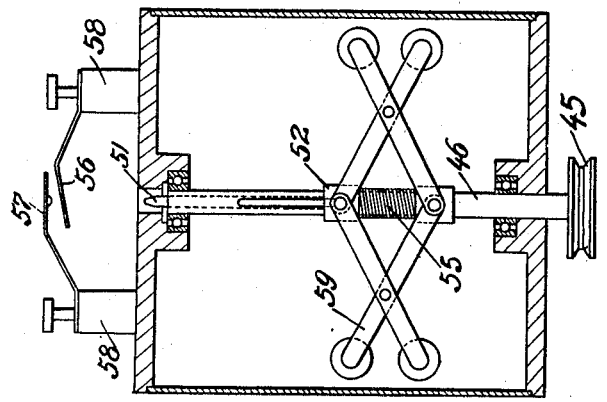
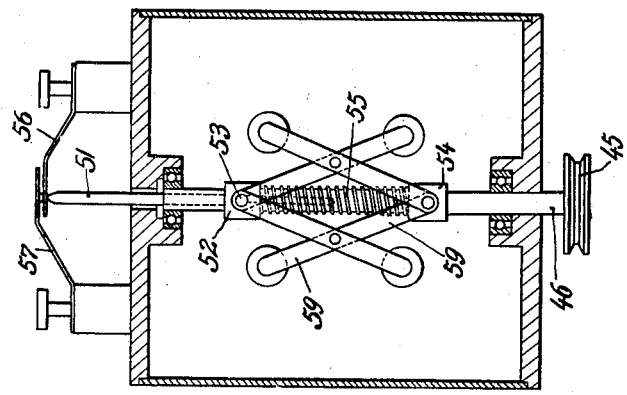
Inventor
HERMANN SCHUMACHER
By
*Attorney*

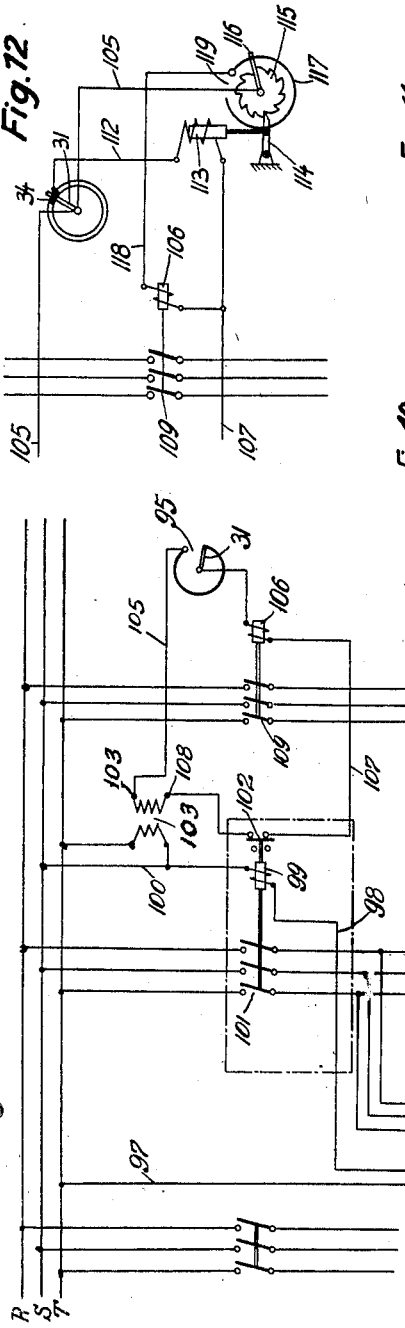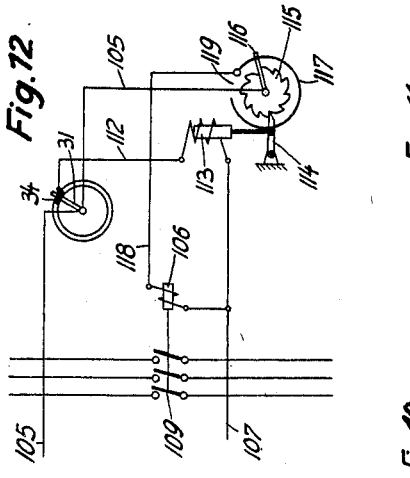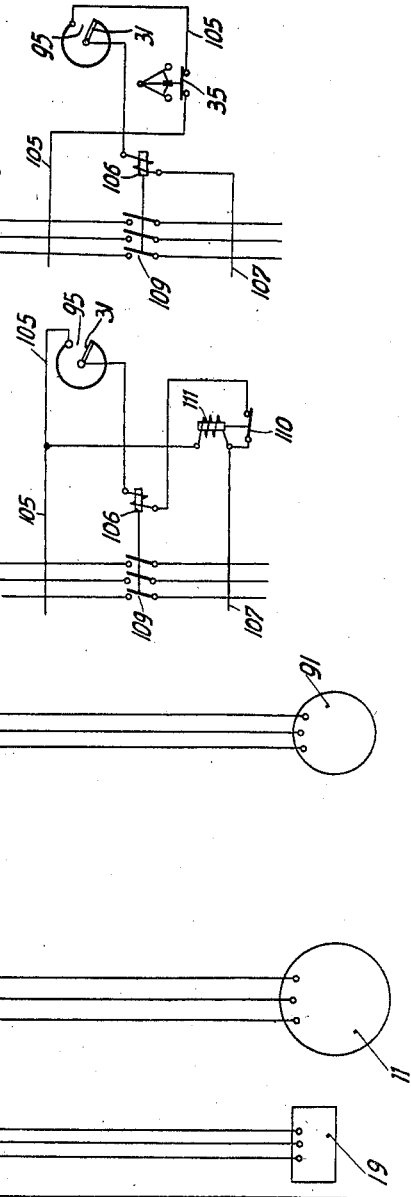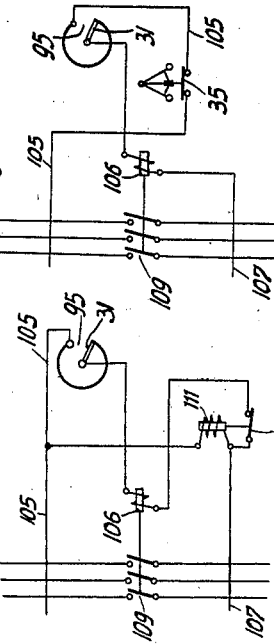

Patented Jan. 11, 1944

2,338,975

UNITED STATES PATENT OFFICE 2,338,975

CONTROLLING MECHANISM FOR LATHES

Hermann Schumacher, Goppingen, Wurttemberg, Germany; vested in the Alien Property Custodian Application July 13, 1940, Serial No. 345,336
In Germany June 20, 1938

4 Claims. (Cl. 82—2)

My invention relates to a controlling mechanism for lathes and its primary object is to provide means for stopping the work spindle of the lathe in a predetermined angular position. This is frequently desirable as the work piece mounted on the work spindle may be conveniently attached thereto or removed therefrom only if the work spindle assumes a predetermined angular position. In lathes, for instance, for turning crankshafts the chuck mounted on the work spindle must be brought to a certain angular position before the work piece can be inserted in or removed from the chuck. In other angular positions the tools would interfere with the work piece.

Prior to my invention a time-consuming manual operation was required, after the lathe had been stopped, to rotate the spindle to such position. Various means could be used for this purpose. In lathes, for instance, in which the spindle drive includes a frictional clutch, the operator could turn the spindle by engaging and disengaging the clutch for short intervals in order to turn the spindle through small angles to the desired position. In lathes in which the spindle is equipped with a manually operable brake, the operator could so control the brake after cutting off the driving motor, that the spindle is arrested in the desired position. Alternatively, the electric driving motor could be so controlled by short current impulses controlled by a press button switch as to turn the spindle to the desired position. All of these manual operations require considerable skill and experience. Another possibility sometimes resorted to is to turn the spindle directly by hand after it has come to rest. But this operation requires that the spindle be first detached from its driving means by disengaging clutches or gears.

It is the object of my invention to provide means which will be automatically put in operation when the machine is stopped and will arrest the work spindle in the required position. My invention is of particular advantage if the same operator must serve a plurality of machines at the same time or in event of mass production of work pieces requiring but a short cutting time so that the intervals of manual operation on the machines are of predominating influence on the cost of manufacture.

I attain these objects by the provision of means which will stop the work spindle in a predetermined angular position after the main driving motor of the lathe or other driving means thereof, such as a clutch, has been disabled.

In a preferred embodiment of my invention I equip the lathe with a centrifugal switch and with a rotary switch clutched to the spindle which so control the machine in cooperation with the motor switch that when the driving motor is cut off the brake will be put in operation and will reduce the speed of the spindle. As soon as this speed reduction has proceeded to a certain limit, the centrifugal switch disables the brake again thus permitting the spindle to slowly continue its rotation. When, in the course of this rotation, the spindle arrives at the required angular position, the rotary switch becomes operative to put the brake in operation again, whereby the spindle will be immediately stopped.

For the clutch I may substitute another auxiliary device adapted to exert a torque on the spindle of the lathe, for instance, an auxiliary motor which, after the main drive has been disabled, becomes active to slowly turn the spindle to the desired position. Then, the rotary switch becomes operative to disable the auxiliary motor so as to stop the machine.

The spindle is driven at so low a speed by the auxiliary motor that when the latter is stopped, no substantial overthrow will occur. Hence, a brake may be dispensed with in this embodiment.

Further features of my invention will appear from a description of preferred embodiments thereof following hereinafter. In the drawings, Fig. 1 is a diagrammatic representation of the spindle and the associated driving and controlling means, Fig. 2 is a diagram of the spindle speed, Fig. 3 is a circuit diagram, Figs. 4 and 5 illustrate the centrifugal switch showing an axial section thereof with the parts assuming different positions, Fig. 6 is a section through the head stock casing of the lathe, Fig. 7 is an elevation viewed from the left of Fig. 6 at a reduced scale, Fig. 8 is a diagrammatic illustration similar to that of Fig. 1 of a modification of my invention;

Fig. 9 the circuit diagram thereof;

Fig. 10 is a modification of the circuit diagram of Fig. 9;

Fig. 11 another modification of the circuit diagram of Fig. 9; and

Fig. 12 a third modification of the diagram of Fig. 9.

In Fig. 1, I have diagrammatically indicated the work spindle 10 carrying the chuck 10' to which a crankshaft K may be attached. The spindle is driven by an electric motor 11, no clutch being interposed. The electric motor drives a shaft 13 by means of pulleys 12 and a belt. The shaft 13 is geared to the spindle 10 through a suitable transmission comprising gears 14 and 15.

A brake disc 16 is attached to the shaft 13 cooperating with a brake strap 17 having one end attached to the frame of the machine and having the other end attached to a brake lever 18 loaded with a weight 18'. The weight may be shifted to adjust the braking couple. The lever 18 is attached to the armature of an electromagnet 19 mounted on the frame of the lathe. By energization of the electromagnet 19 the lever 18 is lifted, whereby the brake 16, 17 is disengaged. The means controlling the circuit of the electromagnet 19 are so interconnected with the means controlling the electric motor 11 that the brake is automatically rendered effective as soon as the motor 11 is cut off. When that happens, the brake will abruptly reduce the speed of the shaft 13.

With the shaft 13 there is connected through suitable means, such as a belt-and-pulley drive 20, a centrifugal switch 35 operative to close a circuit as long as the speed of the shaft 13 does not exceed a certain predetermined limit which is comparatively low amounting, for instance, to 60 R. P. M. However, the centrifugal switch may be directly attached to the shaft 13.

Moreover, I have connected the spindle 10 with a rotary switch adapted to close or interrupt a circuit as soon as the spindle arrives at the angular position at which it is to be stopped. In the embodiment shown in Fig. 1, the spindle 10 is connected by gears 29 with a shaft 30 journalled in the frame of the machine and carrying an arm 31 wiping on a ring 32. This ring is rotatably mounted on the frame of the machine in a known manner and may be manually turned by a worm 33 engaging worm teeth of the ring to any desired angular position. The ring consists of a suitable insulating material. However, it is equipped with a contact plate 34. As soon as the spindle 10 arrives at the position at which it shall be stopped, the wiper 31 engages the contact 34 closing a circuit which will cause the brake to become effective to abruptly stop the spindle.

The centrifugal switch 35 and the rotary switch 31, 34 control the brake-lifting electromagnet 19 in the following manner:

After the motor 11 and the electromagnet 19 have been de-energized at the same time rendering the brake effective, the speed of the spindle 10 will abruptly drop. As soon as the speed has decreased to the limit to which the centrifugal switch 35 is adjusted, the same will close its circuit and will cause a suitable relay mechanism to be described hereinafter to re-energize the lifting electromagnet 19, whereby the brake 16, 17 will be disengaged. The speed at which this happens is so chosen that the spindle will continue its rotation under the effect of its own inertia and that of the work piece connected thereto through at least one complete revolution. At the same time, the centrifugal switch prepares the circuit of the rotary switch. As soon as the spindle slowly continuing its rotation under its inertia arrives at its stopping position, the rotary switch 31, 34 becomes effective and de-energizes the lifting electromagnet 19 again, whereby the brake is made effective again. The brake now arrests the spindle in the required position. Because of the slow speed of rotation at which the brake is engaged the second time, any overthrow of the spindle beyond the required position will be avoided.

In Fig. 2 I have illustrated the speed diaphragm of the spindle. At the point 0 the electric motor 11 is put in operation while the brake-lifting electromagnet 19 is energized at the same time. The speed of the spindle rises fast until the normal working speed is attained at the instant I; at II the operation on the work piece has been finished and the operator will cut off the electric motor 11. The brake is rendered effective automatically at the same time causing the speed to drop abruptly to the speed limit indicated at III. At this instant, the brake is disengaged again allowing the spindle to continue its rotation under its inertia which slowly decreases until the instant IV is reached. At this point, the rotary switch renders the brake effective again, whereupon the spindle is immediately stopped coming to rest at the instant V.

In Figs. 6 and 7 I have illustrated the head stock of the machine. The spindle 10 carrying the chuck 10' is journalled in the side walls of the head stock casing 36 by means of antifriction bearings 37. The pair of gears 29 connects the spindle 10 with a shaft 38 journalled in antifriction bearings 39. This shaft is connected with the shaft 13 by the gears 14. The shaft 13 projects out of the head stock casing 36 and carries a pulley 40 connected by a belt 41 with the pulley 42 attached to the shaft of the electric motor 11 which is mounted on the head stock casing 36. The centrifugal switch 35 is mounted on the head stock casing 36 and is driven from the shaft 13 through a pulley 43 fixed to the shaft 13, through a belt 44 and through a pulley 45 attached to the spindle 46 of the centrifugal switch.

The pulley 43 has a cylindrical flange which is engaged by the braking strap 17 shown in Figs. 1 and 7.

In Fig. 7 the lifting electromagnet 19 is shown which cooperates with the lever 18 carrying the shiftable weight 18'. The rotary switch 31, 34 shown in Fig. 6 is of a slightly modified structure. In the embodiment shown therein the contact ring 32 is geared to the spindle 10 by a toothed wheel 47 engaging teeth 48 of the spindle 10 while the contact arm 31 is rotatably mounted on a bearing pin 49 and is adapted to be angularly adjusted by the manually rotatable worm 33. The arm 31 carries two brushes 50 engaging the periphery and the side face of the ring 32. They are electrically connected by the contact piece inserted therein when the same arrives in position to make contact with the two brushes 50.

The centrifugal switch is shown in Figs. 4 and 5. In its casing there is rotatably mounted the spindle 46 to which the pulley 45 is attached. This spindle is hollow and slidably accommodates a pin 51 which is attached to a collar 52 by a pin 53 extending through longitudinal slots of the hollow spindle 46. A second collar 54 is attached to the spindle 46. A helical spring 55 surrounding the spindle 46 is inserted between the two collars and tends to space the same apart, whereby the pin 51 is projected into contact with a leaf spring 56 pressing the same into contact with a second leaf spring 57. The two contact springs are mounted on insulating brackets 58 attached to the casing.

Weighted levers 59 are pivoted to the collars 52 and 54 and to each other. By the centrifugal force they tend to assume the position shown in Fig. 5 compressing the spring 55, whereby the spring 56 is disengaged. As soon as the rotary speed falls below a certain limit, the two contact springs 56 and 57 are brought in contact with each other.

The circuit arrangement is illustrated in Fig. 3. In order to start the electric motor 11, the operator closes a switch 60 thus completing the following circuit: Phase wire R of the three-phase power line, wires 61, 62, contacts of switch 60, wires 63, relay coil 64, wires 65 and 66, phase wire S of the power line. In this circuit, the relay 64 closes the motor switch 67 thus starting the motor 11 and at the same time attracts its armature 68 which in Fig. 3 is shown in released position.

This armature, when attracted, closes the following circuit: Wires R, 61, 63, 69, armature 68, wires 70, 71, relay coil 72, wires 66 and S. In this circuit, the relay coil 72 is energized and closes the switch 73 connecting the lifting electromagnet 19 to the power line. Now, the lathe is in condition for operation on the work piece.

After the work has been finished, the operator opens the switch 60 thus interrupting the two circuits traced hereinabove. Consequently, the armature 68 will return to the position shown in Fig. 3, the motor 11 will be de-energized and the brake 17 will be put in operation. As soon as the spindle has been slowed down sufficiently, the centrifugal switch 35 will be closed completing the following circuits:

(1) Earthed wire O of the power line, wire 74 input coil of a transformer 75, wire 76, switch 35, wires 77, 78, 61 and R. (2) Wire R of the power line, wires 61, 78, 77, switch 35, wires 76, 83, armature 84 of the relay 80, wires 85, 71, relay coil 72, wire 66 and wire S of the power line. In the second circuit relay coil 72 is energized closing switch 73 which connects the lifting electromagnet 19 to the power line disabling the brake. Hence, the spindle will now freely continue its rotation at reduced speed. In the first circuit the transformer 75 will be energized. Its output coil applies voltage to the following circuit: Terminal 79 of the output coil, relay winding 80, wire 81, armature 86, wires 82 and 86, rotary switch 31, 34, wire 87 and terminal 88 of the output transformer coil. This circuit will be completed as soon as the rotary switch 31, 34 will be closed. When this happens, the relay 80 will be energized attracting its armatures. The lower armature 84 will interrupt the circuit that was traced hereinabove through relay coil 72. Hence, this circuit will be interrupted permitting switch 73 to open and to put the brake into operation which abruptly stops the spindle of the lathe. The second armature 89 of relay 80 closes a holding circuit for the relay 80 which will keep it energized even if the rotary switch 31, 34 should be interrupted prior to the complete stoppage of the spindle by overthrow thereof. This holding circuit may be traced as follows: Terminal 79, relay winding 80, wire 81, armature 89, wire 82, armature 89, terminal 88. This holding circuit will not be interrupted until the operator closes switch 60 for the following cycle of operation, whereby armature 68 will be attracted.

The elements shown in Fig. 8 bearing the same reference characters as those shown in Fig. 2 are identical with the same and function in the same manner. In lieu of the brake or in addition thereto, however, an auxiliary driving device is provided which may rotate the spindle 10 at a very small speed. For this purpose, a gear 90 is freely rotatably mounted on the shaft 13. It is driven by an auxiliary motor 91 through a transmission comprising a pinion 91' on the motor shaft, a gear 92 meshing therewith and a pinion 93 fixed to the gear 92 and engaging the gear 90. On the gear 90 there is mounted the casing 94 of an overrunning clutch of any known type, for instance, of the type including clamping rolls. This clutch permits the shaft 13 to be driven by the main motor 11 at a higher speed than by the slowly rotating gear 90.

Moreover, the rotary switch on shaft 30 is so designed as to interrupt the circuit when arriving at a predetermined angular position. For this purpose, the ring 32 on which the wiper 31 slides is made of conductive material and is interrupted at 95. In this interruption, a piece of insulating material may be inserted to bridge the gap.

The circuit diagram of this embodiment is illustrated in Fig. 9. When the operator closes the motor switch 96, the following circuit will be closed: Phase wire T of the power line, wire 97, switch 96, wire 98, relay 99, wires 100 and S. In this circuit, the relay 99 is energized closing the motor switch 101, whereby the motor 11 is started. When the work has been finished, the operator opens the switch 96, thereby de-energizing the relay 99. Hence, the motor switch 101 is opened and at the same time an armature 102 of the relay 99 closes the following circuit: Terminal 103 of a transformer 104, wire 105, rotary switch 31, 95, relay coil 106, wire 107, armature 102, terminal 108 of the transformer 104. The latter is shunted across the power wires S and T. The relay 106 operates a switch 109 controlling the auxiliary motor 91.

The circuit through relay 106 will be kept in closed condition until the arm 31 of the rotary switch comes to a full stop in the gap 95, thereby de-energizing the relay 106 and stopping the auxiliary motor 91.

The brake-lifting magnet 19 is shunted across the terminals of the main motor 11 and is thereby energized as long as the switch 96 is kept closed. When the switch is opened, the brake will quickly reduce the speed of the spindle. Nevertheless, the latter will revolve several times because of its momentum before the overrunning clutch will engage and transmit motion to the spindle. In the course of these revolutions the wiper 31 will pass the gap 95 and will temporarily interrupt the supply of current to the auxiliary motor 91. Eventually, however, the speed of the spindle 10 will be reduced to that imparted to it from the auxiliary motor 91 through the overrunning clutch 94 and then relay 106 will be de-energized stopping the motor 91 as soon as the wiper 31 will arrive at the gap 95. This results in the immediate stoppage of the spindle 10.

I may avoid the repeated operation of the switch 109 preceding the stoppage of the spindle by modifying the circuit arrangement shown in Fig. 9 in the manner indicated in Figs. 10, 11 and 12. In Fig. 10, the wire 107 includes the armature 110 of a slow-acting relay 111 which is connected with the wires 105 and 107. When the main motor 11 is cut off closing the armature 102, the relay 111 is energized but will not complete the circuit through the relay 106 until the speed of the spindle has been dropped to the limit of the auxiliary drive.

In the embodiment shown in Fig. 11 the centrifugal switch shown in Figs. 4 and 5 is inserted in line 105. When the switch 96 has been opened de-energizing the main motor 11, the auxiliary motor 91 will not start immediately but its start will be delayed until the centrifugal switch 35 closes. Then, the auxiliary motor will positively turn the spindle 10 until the wiper 31 will arrive in the gap 95 thus de-energizing relay 106.

In the embodiment shown in Fig. 12 the rotary switch is of the design shown in Fig. 1. Its arm 31 is connected to wire 105 while the conductive member 34 is connected by a wire 112 to one terminal of the solenoid 113 of an electromagnet whose other terminal is connected with the wire 107. Once in every revolution of the main spindle 10 the following circuit is closed: Transformer terminal 103, wire 105, wiper 31, conductive member 34, wire 112, solenoid 113, wire 107, armature 102, terminal 108 of the transformer, provided that the main motor has been cut off and that armature 102 is in closed condition. The solenoid 113 will attract the core operating a ratchet pawl 114 advancing a ratchet wheel 115 one step. To this wheel 115 a wiper 116 is attached which is connected with the wire 105. The wiper slides on a slip ring 117 which is connected by a wire 118 with the relay 106 and has a gap 119. As long as the wiper 116 slides on the ring 117, the following circuit is closed: Transformer terminal 103, wire 105, wiper 116, ring 117, wire 118, relay 106, wire 107, armature 102, transformer terminal 108. In this circuit, the relay coil 106 is energized, keeping the switch 109 of the auxiliary motor closed. Hence, the auxiliary motor drives the spindle rotating the same at a reduced speed. At every revolution the ratchet wheel 115 is rotated one step, until eventually the wiper 116 arrives at the gap 119 and thus de-energizes the relay 106 thereby immediately stopping the auxiliary motor 91 and the spindle 10.

It will be noted that the various species of my invention described hereinabove are closely related in that an auxiliary device adapted to exert a torque on the spindle 10 is provided in addition to the main motor 11.

In the embodiment shown in Fig. 1 this auxiliary device is the brake the torque of which is so controlled by the rotary switch as to stop the spindle in the desired position. In the modifications described by reference to Figs. 9, 10, 11 and 12, the auxiliary device exerting a torque on the spindle is the auxiliary motor 91.

Moreover, both the species of Figs. 3 and 11 comprise a work spindle 10, an electric motor 11 geared thereto, the auxiliary torque-exerting device 16, 17, or 91 respectively, a rotary switch 31, 34, or 31, 95 respectively, controlling an electric circuit and controlling means 80, or 106 respectively, included in said circuit and controlling the auxiliary device for stopping the spindle in the desired angular position. In both species, a centrifugal switch 35 is driven by the work spindle and is operative to disable the controlling means 80, or 106 respectively, until the spindle has slowed down to a predetermined speed limit.

While I have described specific embodiments of my invention I wish it to be clearly understood that the same is capable of numerous modifications within the scope of the appended claims without departing from the spirit of the invention.

What I claim is:

1. In a lathe, the combination comprising a work spindle, driving means coordinated thereto, a brake cooperatively connected with said spindle, controlling means common to said driving means and said brake and adapted to render the latter effective when the driving means are disabled, means responsive to the speed of said spindle and adapted, when said speed has been reduced by said brake below a certain limit, to disable said brake, thereby allowing the spindle to idle under the influence of its constantly diminishing momentum, and rotary means cooperatively connected with said spindle adapted to function only when the spindle is idling and operative in a predetermined angular position of the spindle to render said brake effective again, whereby the spindle will be stopped in said angular position.

2. In a lathe, the combination comprising a work spindle, an electric motor coordinated thereto, a brake cooperatively connected with said spindle, an electromagnet adapted to disable said brake, electric controlling means adapted to de-energize said electromagnet when said electric motor is de-energized, a centrifugal switch responsive to the speed of said spindle and adapted, when said speed has been reduced by said brake below a certain limit, to re-energize said electromagnet, causing the brake to become disabled, thereby allowing the spindle to idle under the influence of its constantly diminishing momentum, and a rotary switch connected with said spindle adapted to function only when the spindle is idling and operative in a predetermined angular position of the spindle to de-energize said electromagnet again thereby causing the brake to operate, whereby the spindle will be stopped in said angular position.

3. In a lathe, the combination comprising a work spindle, driving means coordinated thereto, an auxiliary device cooperatively connected with said spindle and adapted to exert a torque on said spindle, controlling means common to said driving means and said auxiliary device and adapted to render the latter effective when the driving means are disabled, means responsive to the speed of said spindle and adapted, when said speed has been reduced by said auxiliary device below a certain limit, to control an electrical circuit to disable said auxiliary device thereby allowing the spindle to idle under the influence of its constantly diminishing momentum, and rotary means cooperatively connected with said spindle adapted to function only when the spindle is idling and operative in a predetermined angular position of the spindle to control an electrical circuit to render said auxiliary device effective again whereby the spindle will be stopped in said angular position.

4. In a lathe, the combination comprising a work spindle, an electric motor geared thereto, a friction brake connected with said spindle, means for actuating said brake, an electromagnet adapted, when energized, to render said brake ineffective, and a rotary switch cooperatively connected with said work spindle and adapted, when the latter arrives at a predetermined angular position, to de-energize said electromagnet, the actuating means then operating to render said brake effective.

HERMANN SCHUMACHER.